Sept. 28, 1965 J. F. FARMER ETAL 3,209,075

TELEPHONIC ALARM SYSTEM

Filed Sept. 6, 1961 2 Sheets-Sheet 1

INVENTORS
JAMES F. FARMER
WILLIAM A. MOAKLER
BY Kenyon & Kenyon
ATTORNEYS

TELEPHONIC ALARM SYSTEM

Filed Sept. 6, 1961 2 Sheets-Sheet 2

INVENTORS
JAMES F. FARMER
WILLIAM A. MOAKLER
BY Kenyon & Kenyon
ATTORNEYS

United States Patent Office 3,209,075

Patented Sept. 28, 1965

3,209,075

TELEPHONIC ALARM SYSTEM

James F. Farmer, 26 Cedar Court, Closter, N.J., and William A. Moakler, 24 E. Broad St., Bergenfield, N.J.

Filed Sept. 6, 1961, Ser. No. 136,242

2 Claims. (Cl. 179—5)

This invention relates to alarm systems which make use of standard telephone circuits and equipment for transmitting recorded messages to a central station in the event of fire, power failure, burglary, or the like.

One of the objects of the invention is to provide simple, effective and economical means for sensing the event for which the alarm is to be given, and for then transmitting the information required at a central station to that station.

Another object is to provide such means which can be used with standard telephone circuits and equipment now in use, which can be simply and easily associated with such circuits and equipment, and which will not interfere with their normal use.

Another object is to provide such means which can operate satisfactorily in connection with normal telephone sets and equipment and be effective without removing the handset from the cradle or interfere with normal operation of the equipment and which will on the happening of the event simply and effectively sound the alarm at the central station and give the desired information.

Another object of the invention is to provide such means which is not dependent upon normal power sources which might fail.

The present invention, therefore, contemplates various devices which may be associated with telephonic circuits and equipment to perform functions normally performed by the manipulation of equipment, automatically on the happening of the event for which alarm is to be given. Thus, equipment is provided and associated with the telephone set in the alarm area which will perform the functions normally performed by removing the handset from the cradle and dialing and which will introduce the appropriate information into the telephone circuit without requiring physical manipulation of the elements of the set.

The invention makes use of a sensing means in series with a switch hook relay which controls a phonograph motor and the switch hook circuits, and, if desired, a dialing circuit for use on dial phones, and a transformer for coupling the phonograph with the transmitter circuit, so that when the sensing device functions, the telephone instrument and its circuit will transmit the alarm to the central office.

For the purpose of illustrating the invention, there are shown in the accompanying drawings illustrative circuits therefor which are at present preferred since they give satisfactory results. It will be understood, however, that the invention is not limited to the specific circuits and instrumentalities shown which are merely illustrative of the invention, and that various modifications can be made.

Figure 1:
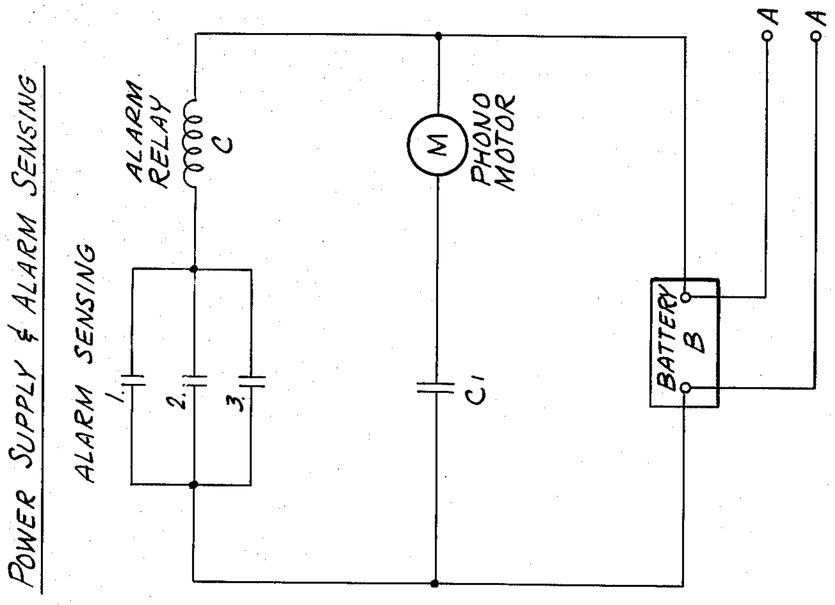
FIG. 1 is a schematic diagram of the alarm sensing portion of the system together with its independent power supply.

Referring to the drawings, in FIG. 1 the alarm sensing means are indicated at 1, 2 and 3. These may be thermostatically controlled switches located at desired points so as to effectively detect fire. If the system is for detecting power failure there may be relays connected in the guarded circuit operated to close on power failure. For burglary detection, they may be associated with doors and windows.

Any number of the sensing devices may be supplied in shunt with each other.

In series with the sensing devices across battery B is shown a switch hook relay C. Phonograph motor M is connected in series with the normally open switch $C^1$ which is controlled by the relay C.

In the drawings, all of the contacts controlled by the relay C are indicated by the letter C with a suitable numeral subscript. They are all shown in their normal non-operative position.

Figures 3, 4:
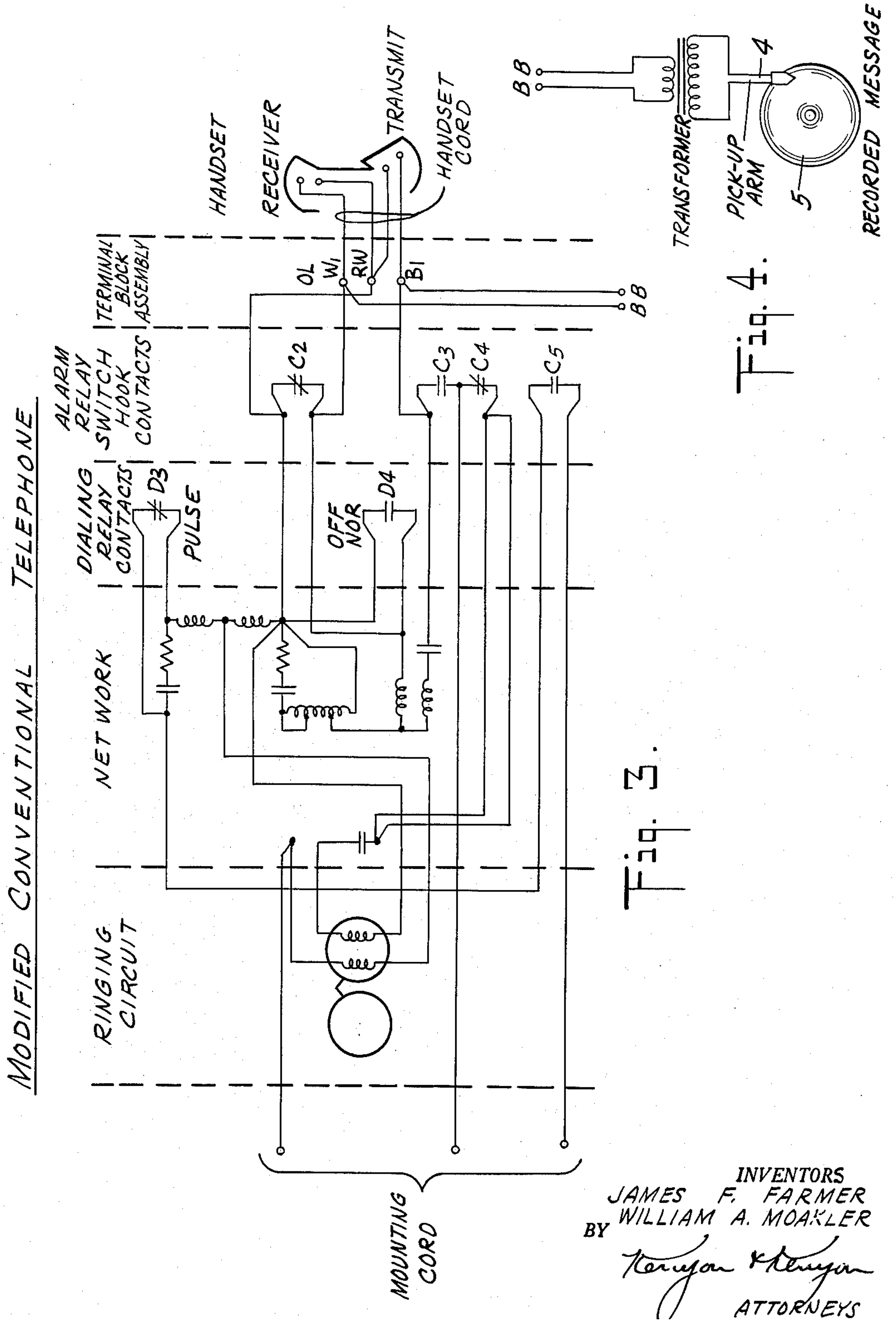
FIG. 3 is a schematic diagram of a conventional telephone circuit showing the various relay connections to the alarm system.
FIG. 4 is a schematic diagram of a phonograph equipped with a record having an alarm message and a transformer coupled to the telephone receiver circuit.

FIG. 3 shows a modified conventional telephone receiver circuit and the connections thereto of the alarm circuit. The dial mechanism, dial contacts, switch hook and switch hook contacts have been removed, and the system's dial relay and switch hook relay contacts now to be described have been substituted.

$C^2$, $C^3$, $C^4$ and $C^5$ are relay contacts operated by the switch hook relay C to achieve the same effect as displacement of the handset from the cradle. Thus, when relay C is energized, contacts $C^2$ and $C^4$ are again connecting the receiver and opening the ringing lines, respectively. Contacts $C^3$ and $C^5$, on the other hand, close, connecting the transmitter circuit and completing the dialing circuit where dialing is involved.

These relay contacts are thus all operated as indicated when the relay C is activated by the alarm sensing elements.

The phonograph pickup arm 4 shown in FIG. 4 is adapted to pick up the recorded message from a disk 5 which is rotated by the phonograph motor M when it is activated by the switch $C^1$. The phonograph output is transformer-coupled as shown in FIG. 4 to the terminal block assembly of the telephone set and is connected thereto at the white $W^1$ and black $B^1$ terminals, which are the receiver and transmitter terminals, respectively, of the set.

It is seen therefore, that the sensing device activates the switch hook circuit and introduces the message into the telephone circuit through the transformer coupler without physically displacing the handset.

The handset shown in FIG. 3 is not a functional part of the device. However, it may be used to personally call in the alarm, or for normal use, if the dial mechanism, switch hook and contacts permitting conventional dialing and transmission are left in, in addition to the systems switch hook and dial contacts. It may also be used for periodic testing with the central station.

The ringing circuit also is not necessary to the functioning of the system. It may be used, however, for test calling by the central station, or, suitably connected, to sound a local alarm.

Figure 2:
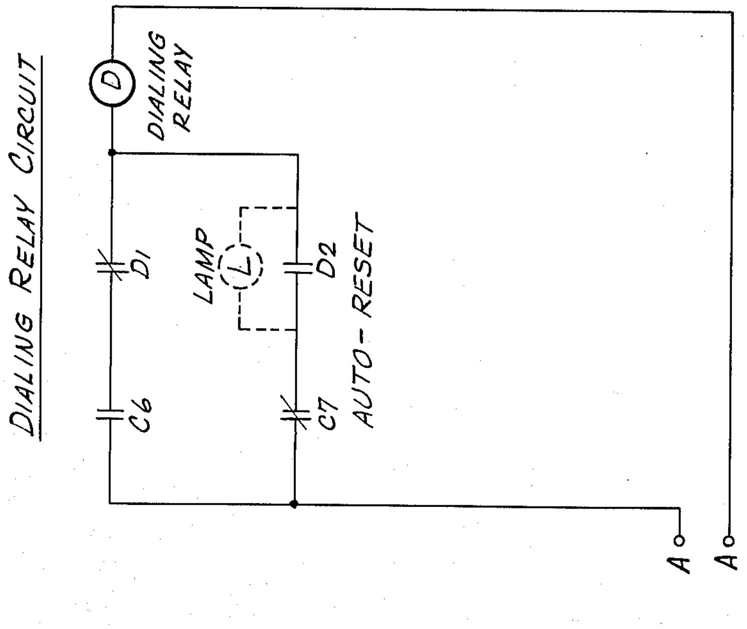
FIG. 2 is a schematic diagram of a dialing relay circuit for use with those embodiments of the invention in which dialing is required.

When dialing is required in order to contact the central office, the dialing relay circuit of FIG. 2 may be used. The dialing relay D can be a motor driven cam type relay, or any suitable latching type relay, or in place of such a "stepping switch," one may use a sequentially operated magnetic impulse counter.

The dialing relay D is in series with its normally closed contact $D^1$ and the normally open relay contact $C^6$ which is controlled by the hook relay C. This series circuit is connected across battery B.

The dialing relay D controls switches $D^3$ and $D^4$ in the dialing circuit of the receiver.

FIG. 2 also shows the circuit for automatically resetting the dialing relay. It comprises normally closed contact $C^7$ and relay contact $D^2$.

The operation of the system is as follows:

When any sensing means is excited, switch hook relay C is energized. This simultaneously moves the contacts controlled by relay C to their operating positions. Contact $C^1$ closes, starting the phonograph motor. Contact $C^2$ opens, activating the receiving portion of the handset. Contacts $C^3$ and $C^5$ close, completing the transmitting and dialing circuits. Contact $C^4$ opens, disconnecting the ringer circuit.

In cases where the dialing system is involved the dialing circuit is activated by closing contact $C^6$ through energy relay C. This energizes dialing relay D.

The contacts of relay D operate sequentially as follows to perform their dialing function.

$D^4$, normally open, closes, eliminating the handset from the circuit during the dialing period. $D^3$ opens and closes ten times, transmitting the dialing pulses to the central office. Thereafter $D^4$ reopens and allows transmission of the recorded message through the transformer circuit.

$D^1$ opens after dialing, disconnecting the dialing relay. $D^2$ then closes, but as $C^7$ is open while relay C is energized, no current flows to relay D until relay C is deenergized. At that time $C^7$ will close and relay D will be automatically reset.

The recorded message relating the event sensed is played on the phonograph, and coupled to the transmitter-receiver contacts B and W through a transformer suitably matching the impedances of the two circuits.

The dialing relay pulse is delayed to insure establishment of the dial tone, as is the message, so that it does not commence until contact may reasonably have been established with the central office. To further insure reception by the central office, the recorded message may be repeated.

It will be appreciated that the present invention may be embodied in other specific forms without departing from the spirit or essential attributes thereof. It is, therefore, desired that the present embodiment be considered in all respects as illustrative and not restrictive, reference being had to the appended claims rather than to the foregoing description to indicate the scope of the invention.

We claim:

1. An alarm system for automatically transmitting an alarm message over a telephone line when a predetermined alarm condition obtains, comprising:

a telephone handset having a network, said network including a transmitting circuit and a dialing circuit, said circuits being connectable to a telephone line, a recording device adapted to play said alarm message when turned on, said alarm message then appearing at the output of said device, dialing means coupled to said dialing circuit of said handset network and adapted to dial a predetermined number when actuated, and alarm means responsive to said predetermined alarm condition to turn on said recording device, to couple the output of said recording device to said transmitting circuit of said handset network, and to actuate said dialing means, whereby the existence of said predetermined alarm condition will energize said alarm means thereby causing said dialing means to dial said predetermined number and connecting the alarm message output of said recording device into said handset network for transmission over telephone wires to whomever responds at said predetermined number.

2. An alarm system for automatically transmitting an alarm message over a telephone line comprising:

a telephone handset having a network, said network including a dialing circuit and a transmitting circuit, said circuits being connectable to a telephone line, a recording device for playing said alarm message when said device is turned on, said message then appearing at the output of said device, alarm sensing means having a first state and a second state, said alarm sensing means being normally in said first state and being responsive to a predetermined alarm condition to be switched into said second state, dialing means having a first state and a second state, said dialing means being normally in said first state and being coupled to said alarm sensing means to be switched into said second state in response to said second state condition of said alarm sensing means, said dialing means being coupled to said dialing circuit of said handset network to dial a predetermined number when said dialing means is in said second state, first signal means responsive to said second state of said alarm sensing means to switch said dialing means into said second state of said dialing means, second signal means responsive to said second state of said alarm sensing means to turn on said recording device, and third signal means responsive to said second state of said alarm sensing means to couple the output of said recording device to said transmitting circuit of said handset network.

References Cited by the Examiner

UNITED STATES PATENTS

| | | | |
|---|---|---|---|
| 2,371,051 | 3/45 | Kendig | 179—5.1 |
| 2,498,613 | 2/50 | Talbot | 179—5.1 |
| 2,555,714 | 6/51 | Talbot | 179—5.1 |
| 2,768,239 | 10/56 | Foster | 179—5.1 |
| 2,907,828 | 10/59 | Tegeler | 179—5.1 |

DAVID G. REDINBAUGH, *Primary Examiner.*

ROBERT H. ROSE, *Examiner.*